No. 822,980. PATENTED JUNE 12, 1906.
M. OTTO.
WATER OZONIZING APPARATUS.
APPLICATION FILED JULY 14, 1905.

Witnesses
O. Knight
P. F. Smith

Inventor
Marius Otto
By his Attorneys
Knight Bros.

UNITED STATES PATENT OFFICE.

MARIUS OTTO, OF PARIS, FRANCE, ASSIGNOR TO AMERICAN OZONE COMPANY, OF NIAGARA FALLS, NEW YORK, A CORPORATION OF NEW YORK.

WATER-OZONIZING APPARATUS.

No. 822,980.  Specification of Letters Patent.  Patented June 12, 1906.

Application filed July 14, 1905. Serial No. 269,691.

*To all whom it may concern:*

Be it known that I, MARIUS OTTO, a citizen of the Republic of France, residing at Paris, France, have invented certain new and useful Improvements in Water-Ozonizing Apparatus, of which the following is a specification.

My invention relates to apparatus for treating water with ozone, and is especially concerned with a simple and efficient means for sterilizing the water and removing the excess ozone therefrom.

The object of my invention is to produce an apparatus comprising a tank and separator in which the treatment of the water by the ozone, as well as the separation of the excess of ozone from the water, takes place prior to discharging the sterilized water through the discharge-pipe.

The following particular advantages are present in my apparatus:

First. The duration of time during which the water and ozone are in contact with each other is prolonged, so that the water is more perfectly sterilized.

Second. A certain volume of ozonized water is maintained in the receptacle in such a manner that before it is discharged it will have had ample time and opportunity for being freed of the excess of ozone.

My invention is illustrated in the accompanying drawings, in which—

Figure 1:
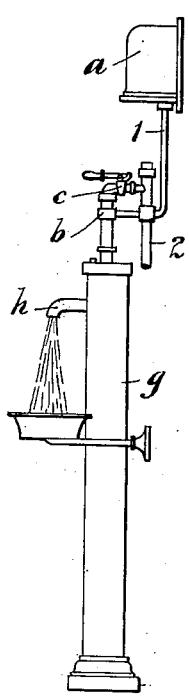
Figure 2:
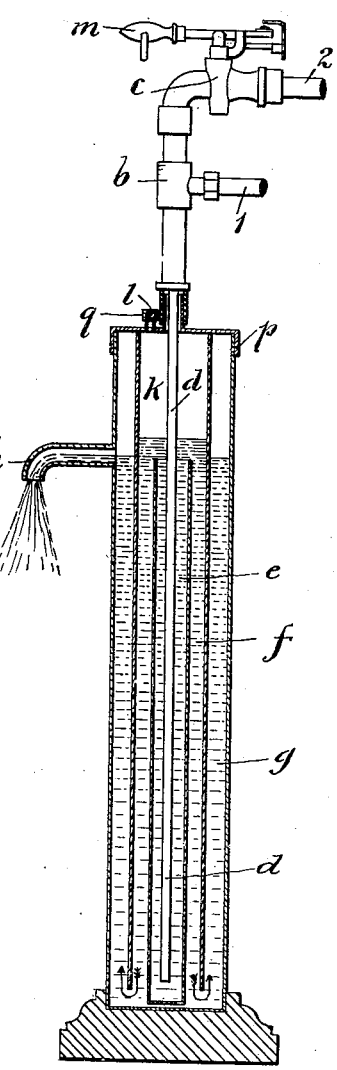
Figure 3:
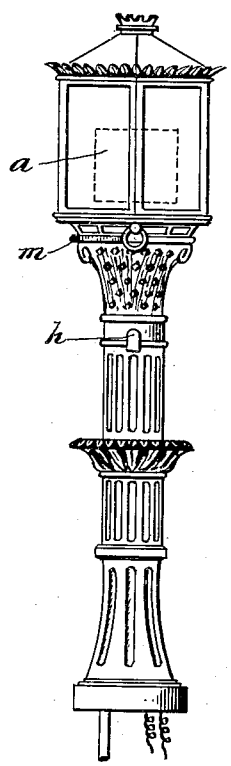
Figure 4:
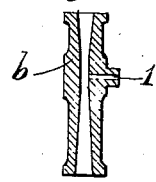

Figure 1 is a general elevation of the entire system. Fig. 2 is a side elevation, part in section, showing particularly the arrangement of the mixing and separating chambers. Fig. 3 is an elevation of a water-hydrant to which my improved apparatus is especially applicable. Fig. 4 is a detail view of the emulsifier whereby the ozone is drawn into the water-pipe by the current of water.

Referring now more specifically to said drawings, $a$ designates any suitable form of ozone-supplying apparatus from which ozone may be conducted by the conduit 1 into an emulsifier $b$ by operating a compound water-valve and electric switch $c$ by means of the handle $m$. A water-pipe 2 leads into the compound valve and switch $c$ and supplies the water which passes through the circuit controlled by the valve portion of the member $c$ and which passing through the emulsifier $b$ serves as the means for drawing in the ozone.

The particular construction of the compound water-valve and electric switch $c$ is shown and claimed broadly in a copending application filed by me May 13, 1905, Serial No. 260,324.

To accomplish the sterilization, the mixture of water and ozone is further carried out in a special apparatus consisting of a series of concentric tubes $d\ e\ f\ g$, alternately opening one into the other at the bottom and top, as clearly shown in Fig. 2, thereby offering a tortuous passage to the water under treatment. While I have shown four such tubes, I do not limit my invention to apparatus in which this particular number of tubes is employed, as it is obvious that any desirable number of tubes might be used without departing from the spirit of my invention. For this purpose the innermost tube $d$, which leads the mixture of water and ozone coming from the emulsifier $b$ into the next of the concentric tubes $e$, opens at the bottom of the said tube $e$. The tube $e$ in turn leads the water and ozone upwardly and opens at the upper portion of the next concentric tubes $f$. The tube $f$ leads the water and ozone downwardly again and discharges it at the bottom of the outermost tube $g$, which leads the water, which by this time is completely sterilized, upwardly to the discharge-pipe $h$. While the ozone and water are in contact with each other in passing through the concentric tubes the sterilization of the water takes place. The water in the tube $f$ allows the excess of ozone to escape from its surface into the space $k$, which communicates with the outside air by means of the port $q$, in which a wadding of cotton-waste $l$ is inserted. This port $q$, with a wadding of cotton-waste, thus acts as a kind of safety-valve, so that the pressure of the gas accumulating in the chamber $k$ will not rise too high. As above stated, the delivery of sterilized water takes place through the discharge-pipe $h$. If desired, the discharge-pipe $h$ may be provided with a suitable valve operated independently of the compound valve and switch $c$.

In Fig. 3 I have shown a water-post which is provided with my invention. The ozonizer $a$ is placed in the box or case at the top of the post and suitably connected with the source of electric current. An operating-lever for a compound electric switch and water-valve is shown at m, and the sterilized water is discharged through the discharge-pipe h, which discharges the water into the basin below.

In water-receptacles arranged as herein described the double result above referred to is obviously obtained—that is:

First. The water which is to be sterilized and the ozone for sterilizing the water remains mixed for as long a period as may be regarded necessary.

Second. The water saturated with ozone is not directly delivered for consumption. The excess of sterilizing-gas is separated out in the chamber k either during the ascending movement of the water between the tubes d and e or during its descending motion between the tubes e and f.

Each time the handle m is depressed the water-circuit is opened and the electric circuit to the ozone-supplying means is closed, so that fresh water passes through the preliminary mixer b and draws in through the conduit l freshly-ozonized air, the amount of water thus allowed to enter the system being equal to that delivered at the discharge-pipe h. This added amount is not, however, at once delivered for consumption, but is held in reserve in the apparatus, thereby giving it time to become completely sterilized and have all traces of the remaining ozone removed from it.

The chamber k instead of being supplied by an opening q for discharging the free excess of ozonized air may be utilized as a compression-chamber. The ozonized air not utilized which would escape therefrom would then have to pass through a supplementary series of concentric tubes disposed between the tubes f and g.

Having thus described the invention, what I claim as new, and desire to secure by Letters Patent, is—

1. A mixing and separating device for sterilizing water by ozone, comprising a series of concentrically-arranged cylindrical compartments opening in opposite directions one into the other, the outermost of said cylindrical compartments being provided with a discharge-outlet and one of the inner compartments having a separation-chamber, and a safety-valve.

2. An arrangement forming tank and separator for the excess of ozone in the receptacle for the sterilized water consisting in a series of concentric cylinders e, f, g, alternately closed at the bottom and top arranged around an axial tube d, through which the ozonized air enters in such way that the mixture of water and ozone is forced to follow an alternating descending and ascending course through the annular spaces between said cylinders, the outer cylinder g, forming the cover to which the tube for taking the water h, and the upper part k, of one of the cylinders closed at the top forming the separating-chamber for the escapement of the excess of ozone.

MARIUS OTTO.

Witnesses:
H. A. COXE,
ALPHONSE BERTHIE.